(12) United States Patent
Faber et al.

(10) Patent No.: US 9,042,429 B2
(45) Date of Patent: May 26, 2015

(54) INTERFERENCE CANCELLATION RADIO RECEIVER

(71) Applicants: Christian Faber, Munich (DE); Andreas Senst, Munich (DE); Manfred Zimmermann, Sauerlach (DE); Lothar Winkler, Duesseldorf (DE)

(72) Inventors: Christian Faber, Munich (DE); Andreas Senst, Munich (DE); Manfred Zimmermann, Sauerlach (DE); Lothar Winkler, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/929,228

(22) Filed: Jun. 27, 2013

(65) Prior Publication Data

US 2015/0003509 A1   Jan. 1, 2015

(51) Int. Cl.
*H04B 1/00* (2006.01)
*H04L 27/01* (2006.01)
*H04L 25/02* (2006.01)
*H04L 5/00* (2006.01)

(52) U.S. Cl.
CPC ............ *H04L 27/01* (2013.01); *H04L 25/0212* (2013.01); *H04L 25/022* (2013.01); *H04L 25/0242* (2013.01); *H04L 5/0048* (2013.01); *H04L 5/0023* (2013.01); *H04L 25/024* (2013.01)

(58) Field of Classification Search
CPC ............ H04W 72/082; H04W 52/241; H04W 52/243; H04W 92/20; H04L 5/0073; H04L 25/0204; H04L 27/01; H04L 27/2691
USPC .......................................................... 375/148
See application file for complete search history.

(56) References Cited

U.S. PATENT DOCUMENTS

| 6,639,906 | B1* | 10/2003 | Levin | 370/342 |
| 7,437,135 | B2* | 10/2008 | Pan et al. | 455/284 |
| 8,472,877 | B2* | 6/2013 | Hou et al. | 455/63.1 |
| 8,588,349 | B2* | 11/2013 | Nagarajan et al. | 375/346 |
| 2001/0053171 | A1* | 12/2001 | Sato et al. | 374/121 |
| 2013/0142291 | A1* | 6/2013 | Dinan | 375/343 |

* cited by examiner

*Primary Examiner* — Dhaval Patel
(74) *Attorney, Agent, or Firm* — Schiff Hardin LLP (57) ABSTRACT

A radio receiver apparatus includes a serving cell detector configured to generate a detected serving cell signal based on a serving cell detector input signal. The radio receiver apparatus further includes a first interfering cell detector configured to generate a detected first interfering cell signal based on a first interfering cell detector input signal and a first interfering cell synthesizer configured to generate synthesized first interfering cell signal based on the detected first interfering cell signal. A serving cell interference removing unit is configured to remove the synthesized first interfering cell signal from a serving cell signal to generate the serving cell detector input signal.

23 Claims, 9 Drawing Sheets

INTERFERENCE CANCELLATION RADIO RECEIVER

TECHNICAL FIELD

Embodiments described herein generally relate to the field of radio communications, and more particularly to the technique of interference cancellation in radio receivers of radio networks, in particular cellular radio networks.

BACKGROUND

The performance of radio receivers may at least in specific scenarios be limited by interference from neighboring cells. Reducing this interference can improve the signal to noise ratio at the receiver and may improve the data throughput. Approaches of reducing neighboring cell interference are to use a joint detection scheme or a linear interference-aware equalizer, e.g. a linear type 3i interference-aware chip-level equalizer.

BRIEF DESCRIPTION OF THE DRAWINGS

Aspects of various embodiments are made more evident by way of example in the following detailed description of embodiments when read in conjunction with the attached drawing figures, wherein.

DESCRIPTION OF EMBODIMENTS

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding identical or similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments may be implemented on a single semiconductor chip or on multiple semiconductor chips connected to each other. Furthermore, it should be understood that embodiments may be implemented in software or in dedicated hardware or partially in software and partially in dedicated hardware.

The radio receiver apparatus described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). A 3GPP Long Term Evolution (LTE) network, which is based on the GSM/EDGE and UMTS/HSPA (High Speed Packet Access) technologies, includes radio receiver apparatus configured for operation in accordance with the LTE standard.

In the following the terms "mobile station" and "UE" (User Equipment) shall have the same meaning, which meaning shall comprise the definitions given in the various standards (e.g. UMTS, LTE and derivatives thereof). By way of example, a UE may be represented by a cellular phone, a smartphone, a tablet PC, a laptop, etc. Further, in the following the terms "base station" and "NodeB" shall have the same meaning, which meaning shall comprise the definitions given in the various standards (e.g. UMTS, LTE and derivatives thereof).

By way of example, a radio network considered herein may be a cellular radio network such as, e.g., UMTS (Universal Mobile Telecommunications System) including developments such as, e.g., HSPA (High Speed Packet Access). By way of example, the cellular radio network may be a WCDMA (Wideband CDMA) system defined by the 3GPP ($3^{rd}$ Generation Partnership Project).

Figure 1:
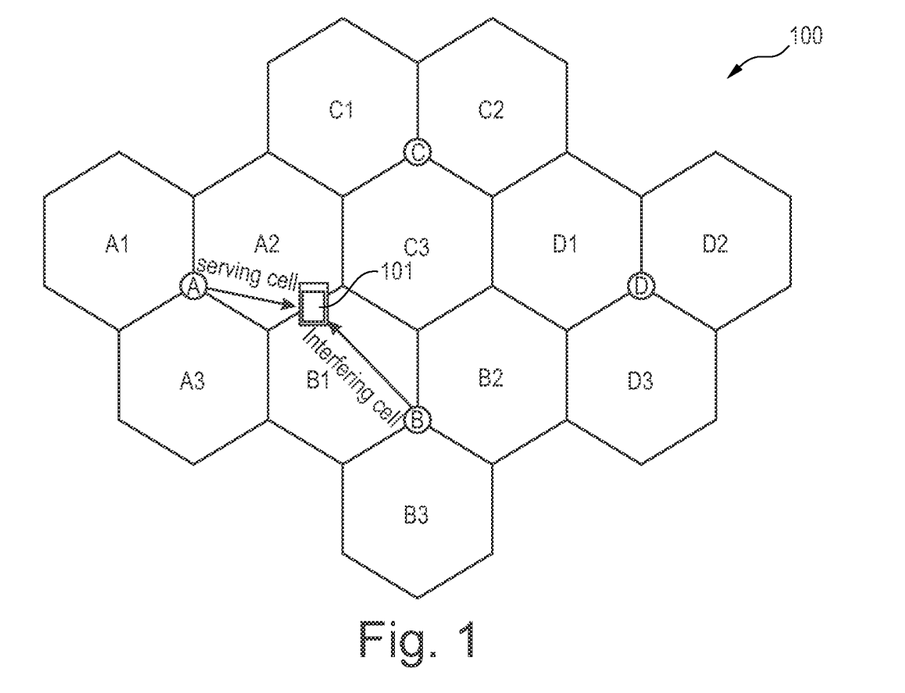
FIG. 1 is a schematic diagram illustrating a first cell boundary scenario in a cellular radio network.

In FIG. 1 an exemplary radio network 100 is shown. The radio network 100 may be a cellular radio network 100. The radio network 100 may include several base stations (NodeB) referred to as A, B, C, D, . . . and a plurality of user terminals, which are referred to as UEs in the following and of which one exemplary UE 101 is depicted in FIG. 1.

The cellular radio network 100 is composed of cells, wherein each cell is served by a base station A, B, C, D, . . . . By way of example, cells A1, A2, A3 are served by base station A, cells B1, B2, B3 are served by station B, cells C1, C2, C3 are served by base station C, and cells D1, D2, D3 are served by base station D.

Cells served by different base stations (e.g. A1, B1) typically use differently coded signals in order to reduce interference from neighboring cells. Coding, in this context, shall have a broad meaning including time division coding, frequency division coding, scrambling, etc. By way of example, considering e.g. a WCDMA cellular radio network 100, signals from different base stations A, B, C, D are encoded by different scrambling codes.

UE 101 is located near to a cell boundary. Byway of example, cell A2 is the serving cell and cell B1 is an interfering cell. That is, UE 101 uses the scrambling code allocated to base station A in order to detect the signals of the serving cell. The scrambling code allocated to base station B is different from the scrambling code allocated base station A.

Figure 2:
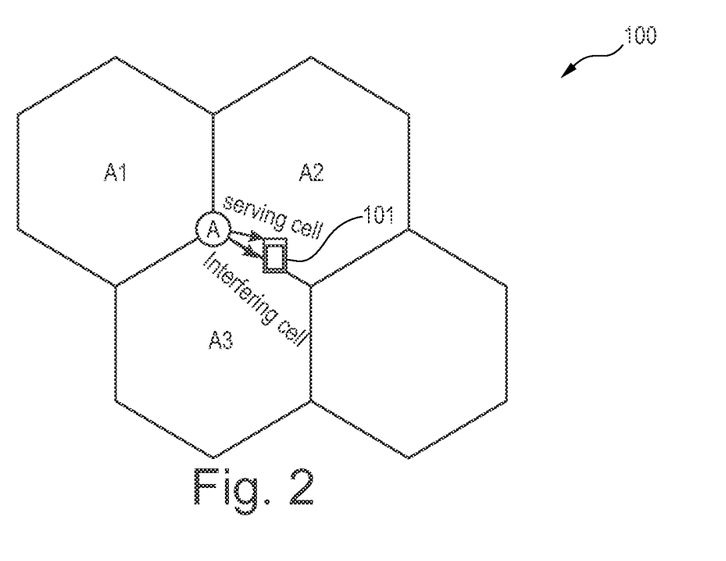
FIG. 2 is a schematic diagram illustrating a second cell boundary scenario in a cellular radio network.

FIG. 2 illustrates another cell boundary scenario. Here, the UE 101 is located near to the cell boundary of cells A2 and A3 served by the same base station A. That is, in this example, cells are sectors of the same base station. Byway of example, cells A1, A2 and A3 served by base station A are generated by directional antennas with, e.g., a 120° radiation pattern. Cell A2 is the serving cell and A3 is the interfering cell. If the transmitted power of the serving cell A2 and the interfering cell A3 is the same, a carrier to interference ratio (Ior/Ioc) of 0 dB may be obtained.

In both scenarios of FIG. 1 and FIG. 2 the data throughput at a cell edge is not limited by low signal strength due to path losses but by interference from the interfering cell(s). Reducing or even removing this interference may improve the signal-to-noise ratio at the UE 101 (e.g. comprising the radio receiver apparatus under consideration) and may increase the data throughput.

It is to be noted that the term "cell" as used herein may have a broad meaning. It may comprises both the meaning of a cell sector A1 or A2 or A3 or B1, . . . and the meaning of a cell spanned by one base station, e.g. one cell composed of cell sectors A1, A2, A3. In the first case cell boundaries are defined by cell sector boundaries (FIG. 2) and boundaries of cells of different base stations (FIG. 1) whereas, in the second case, cell boundaries are only defined by boundaries of cells of different base stations (FIG. 1).

Figure 3:
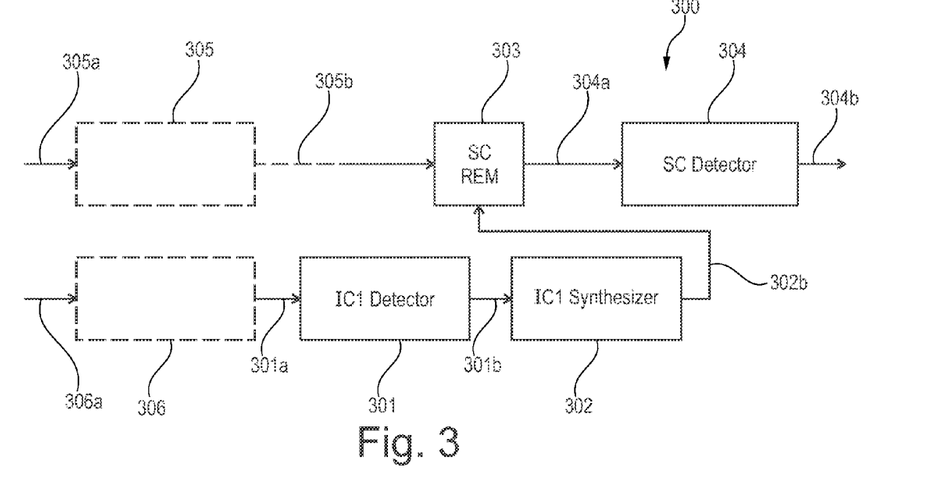
FIG. 3 is a block diagram illustrating an exemplary implementation of a radio receiver apparatus in accordance with the disclosure.

FIG. 3 illustrates, by way of example, a block diagram of an exemplary radio receiver apparatus 300. The radio receiver apparatus 300 may comprise an interfering cell detector 301, an interfering cell synthesizer 302, a serving cell interference removing unit 303, and a serving cell detector 304. Further, the radio receiver apparatus 300 may comprise a serving cell signal processing structure 305 and an interfering cell signal processing structure 306.

An input 305a of the serving cell signal processing structure 305 may be coupled to a frontend (not illustrated) of the UE in which the radio receiver apparatus 300 is implemented. The frontend may comprise one or more antennas and a RF (radio frequency) stage. The serving cell signal processing structure 305 may comprise an equalizer, e.g. a linear interference-aware equalizer as will be described in more detail further below. Further, the serving cell signal processing structure 305 may comprise a delay unit and/or a frequency correction unit for signal alignment.

The input signal 305a of the serving cell signal processing structure 305 is a signal which is transmitted from one cell, i.e. the serving cell. The serving cell signal processing structure 305 may be matched to the serving cell, e.g. may equalize this signal to remove the signal distortions caused by the serving cell transmission channel. The serving cell signal processing structure 305 outputs a serving cell signal 305b. This serving cell signal 305b may be a baseband signal. The serving cell signal 305b contains interference caused by an interfering cell. The stronger the interfering cell and/or the closer the radio receiver apparatus 300 is located to a serving cell-interfering cell boundary, the greater is the interference introduced into the serving cell signal 305b. In conventional radio receive apparatus, this interference adds up with noise and may limit the detector performance.

The interference contained in the serving cell signal 305b is, in nature, deterministic. According to FIG. 3, the interfering cell detector 301 operates on an interfering cell detector input signal 301a which may be output by the interfering cell signal processing structure 306.

The interfering cell signal processing structure 306 may be similar to the serving cell signal processing structure 305 in view of implementation, and reference is made to the above description in order to avoid reiteration. However, the interfering cell signal processing structure 306 receives an interfering cell input signal 306a transmitted from the interfering cell. Further, the interfering cell signal processing structure 306 performs a signal processing matched to the interfering cell, e.g. an equalization of the interfering cell input signal 306a in order to remove signal distortions caused by the interfering cell transmission channel.

The interfering cell detector 301 may detect symbols transmitted by the interfering cell. A detected interfering cell signal 301b output from the interfering cell detector 301 may be coupled to the interfering cell synthesizer 302. The interfering cell synthesizer 302 may generate a synthesized interfering cell signal 302b based on the detected interfering cell signal 301b. The synthesized interfering cell signal 302b may correspond to a signal received at the radio receiver apparatus 300 from the interfering cell and distorted by the serving cell signal processing structure 305, i.e. may correspond to interference from the interfering cell contained in the serving cell signal 305b.

The serving cell interference removing unit 303 is configured to remove the synthesized interfering cell signal 302b from the serving cell signal 305b output by the serving cell signal processing structure 305. That way, the interference from the interfering cell contained in the serving cell signal 305b is removed. Removal of the interference from the serving cell signal 305b relies on the fact that the interference is deterministic in nature, i.e. can be detected by interfering cell detector 301.

An output of the serving cell interference removing unit 303 may be coupled to an input of the serving cell detector 304. The serving cell detector 304 is configured to generate a detected serving cell signal 304b based on a serving cell detector input signal 304a. The serving cell detector input signal 304a may be output from or derived from an output of the serving cell interference removing unit 303.

Figure 4:
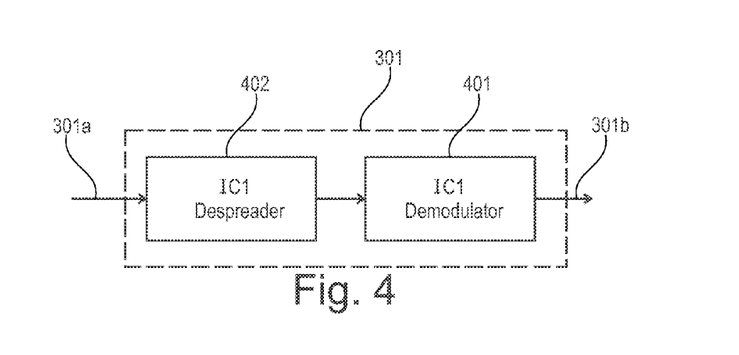
FIG. 4 is a block diagram illustrating an exemplary implementation of an interfering cell detector.

FIG. 4 illustrates an exemplary implementation of the interfering cell detector 301. The interfering cell detector 301 may comprise an interfering cell demodulator 401. The interfering cell demodulator 401 may output hard or soft detected symbols (e.g. detected constellation points of a symbol alphabet and, optionally, a confidence quantity associated with the detection result) of symbols transmitted by the interfering cell. Symbols of all channels of the interfering cell (e.g. dedicated channels of one or more users, control channels, shared channels such as, e.g., HS-PDSCH (High Speed Physical Downlink Shared CHhannel) and others) may be provided in the detected interfering cell signal 301b.

The interfering cell detector 301 may further comprise an interfering cell despreader 402. The interfering cell despreader 402 may despread the interfering cell detector input signal 301a in order to extract signals associated with different channels and/or users. If no CDMA radio network 100 is used, instead of the interfering cell despreader 402, a de-channelization unit configured to extract signals transmitted via different channels of the interfering cell may be used.

In the following, without loss of generality, a CDMA radio network 100 is assumed for ease of explanation. The interfering cell despreader 402 (or the corresponding de-channelization unit in case of a non-CDMA network) needs to have information about the channels used in the interfering cell, i.e. the used spreading codes in an CDMA network.

There are different possibilities to gain knowledge about the used spreading codes (channel allocations) for the interfering cell despreader 402. One possibility is to signal the spreading codes used by the interfering cell to the radio receiver apparatus 300. Another possibility is to obtain the knowledge about the spreading codes used by the interfering cell by measurement. An exemplary implementation of the measurement approach will be described in more detail further below.

Figure 5:
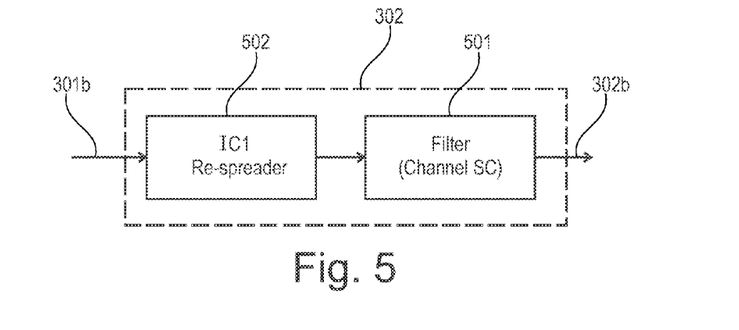
FIG. 5 is a block diagram illustrating an exemplary implementation of an interfering cell synthesizer.

FIG. 5 illustrates an exemplary implementation of the interfering cell synthesizer 302. The interfering cell synthesizer 302 may comprise a filter 501 configured to apply an interfering cell channel distortion based on estimated channel coefficients of the interfering cell to the synthesized interfering cell signal 302b. Further, the synthesized interfering cell signal 302b may be matched to the serving cell signal 305b based on equalizer coefficients used in the serving cell signal processing structure 305.

The interfering cell synthesizer 302 may further comprise a re-spreader 502 configured to re-spread the detected interfering cell signal 301b (e.g. the demodulated interfering cell symbols of the at least one demodulated interfering cell channel) by the spreading code used in the interfering cell. A signal output by the re-spreader 502 may thus correspond to the signal transmitted by the base station of the interfering cell. As mentioned earlier, information about the spreading code(s) used in the interfering cell may be obtained via signaling or by measurement.

The serving cell detector 304 may be similar to the interfering cell detector 301 in view of implementation. That is, the serving cell detector 304 may comprise a serving cell despreader (not shown) configured to despread the serving cell detector input signal 304a and/or a serving cell demodulator (not shown) configured to generate demodulated serving cell symbols (e.g. hard or soft detected symbols). The serving cell detector may have a high performance and/or a high throughput because interference has been removed from the serving cell detector input signal 304a by the serving cell interference removing unit 303 prior to detection.

Figure 6:
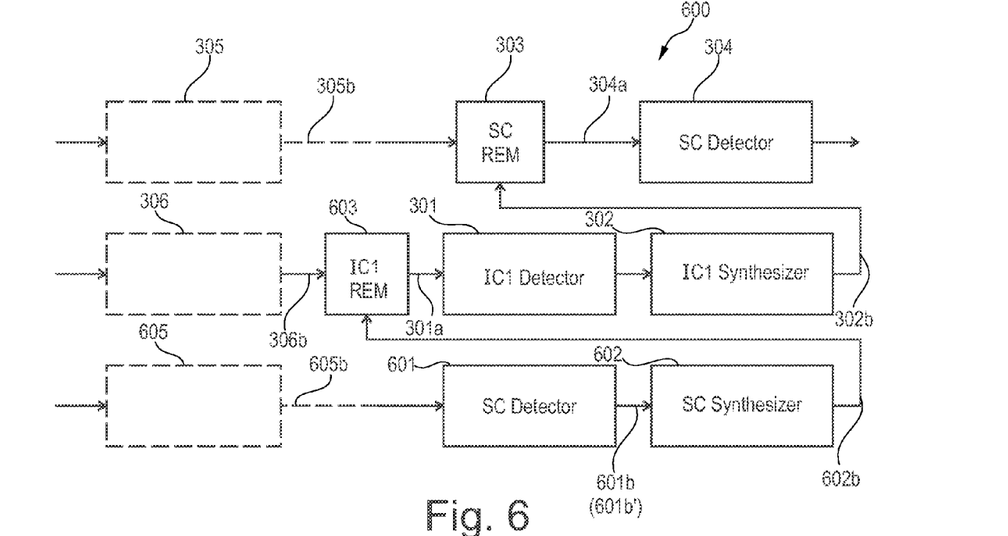
FIG. 6 is a block diagram illustrating an exemplary implementation of a radio receiver apparatus having an interfering cell interference removing unit in accordance with the disclosure.

FIG. 6 illustrates an exemplary implementation of a radio receiver apparatus 600. The radio receiver apparatus 600 may be identical to radio receiver apparatus 300 except that it may further comprise a serving cell detector 601, a serving cell synthesizer 602 and an interfering cell interference removing unit 603. Further, it may comprise a second serving cell signal processing structure 605.

The second serving cell signal processing structure 605 may have an implementation similar to the implementation of the serving cell signal processing structure 305, and reiteration of the description is avoided for the sake of brevity. Further, as will be explained in more detail below (see, e.g., FIGS. 12 to 14) the serving cell signal processing structure 305 and the second serving cell signal processing structure 605 may be implemented by the same hardware. That is, the output signal of the second serving cell signal processing structure 605 may, e.g., be the serving cell signal 305b. In other implementations the second serving cell signal processing structure 605 may be a hardware duplicate of the serving cell signal processing structure 305.

The serving cell signal 605b output by the second serving cell signal processing structure 605 may be input to the serving cell detector 601. The serving cell detector 601 may despread and demodulate the serving cell signal 605b. An output of the serving cell detector 601 may be provided to the serving cell synthesizer 602. The serving cell synthesizer 602 may generate a synthesized serving cell signal based on the detected serving cell signal 601b. An output of the serving cell synthesizer 602 may be coupled to an input of the interfering cell interference removing unit 603. The interfering cell interference removing unit 603 may be configured to remove the synthesized serving cell signal 602b from an interfering cell signal 306b output by the interfering cell signal processing structure 306. Thus, the interference from the serving cell is removed from the interfering cell detector input signal 301a. The interfering cell detector 301 may thus have a better performance and/or a higher throughput than in the radio receiver apparatus 300 of FIG. 3. As a consequence, the synthesized interfering cell signal 302b output by the interfering cell synthesizer 302 may have a better quality than in the radio receiver apparatus 300. By way of example, the serving cell interference removing unit 303 removes interference from the interfering cell better than in the radio receiver apparatus 300 of FIG. 3.

Figure 7:
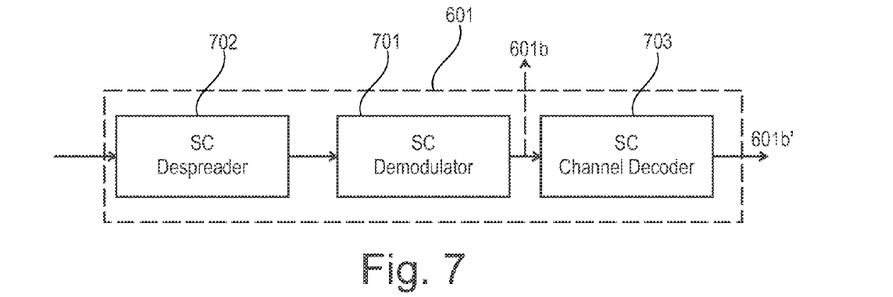
FIG. 7 is a block diagram illustrating exemplary implementations of a serving cell detector.

FIG. 7 illustrates, by way of example, two different implementations of the serving cell detector 601. According to a first possibility, the serving cell detector 601 may comprise a serving cell demodulator 701 and, e.g., a serving cell despreader 702 (or another de-channelization unit as mentioned before). The spreading codes (or, more generally, the channelization information) used by the serving cell despreader 702 are known in the radio receiver apparatus 600. The serving cell demodulator 701 may, according to the first possibility, output the detected serving cell signal 601b comprising of detected symbols transmitted by the serving cell. In this case, the design of the serving cell detector 601 is similar to the design of the interfering cell detector 301 in view of hardware implementation.

According to another possibility, the serving cell detector may further include a serving cell channel decoder 703. The serving cell channel decoder 703 may be configured to generate a channel decoded serving cell signal 601b' as the detected serving cell signal 601b.

Figure 8:
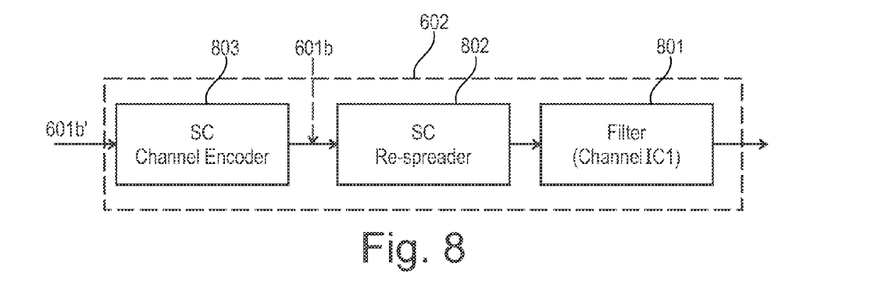
FIG. 8 is a block diagram illustrating exemplary implementations of a serving cell synthesizer.

FIG. 8 illustrates, by way of example, exemplary implementations of the serving cell synthesizer 602. According to a first implementation, the serving cell synthesizer 602 receives the detected serving cell signal 601b at an input of a serving cell re-spreader 802. The serving cell re-spreader 802 re-spreads the detected serving cell signal 601b by the spreading codes used by the serving cell. More generally, the serving cell re-spreader provides for re-channelization of the detected serving cell signal 601b. An output of the serving cell re-spreader 802 may correspond to the signal transmitted by the base station of the serving cell.

The output of the serving cell re-spreader 802 may be provided to a filter 801. Filter 801 may distort the re-spreaded signal by using estimated channel coefficients of the serving cell channel. Further, the re-spread signal may be matched to the interfering cell signal 306b based on equalizer coefficients used in the interfering cell signal processing structure 306.

In a second implementation the serving cell synthesizer may further comprise a serving cell channel encoder 803. The output signal of the serving cell channel decoder 703, i.e. the detected serving cell signal 601b', is input to the serving cell channel encoder 803. That way, the detected serving cell signal 601b' is re-encoded by using, e.g., appropriate FEC (forward error correction) channel codes. As the transport block format and the channel codes used by the serving cell are known to the radio receiver apparatus 600, (optional) channel decoding in the serving cell detector 601 and (optional) channel encoding in the serving cell synthesizer 602 are available to the radio receiver apparatus 600 without additional signaling necessary.

Figure 9:
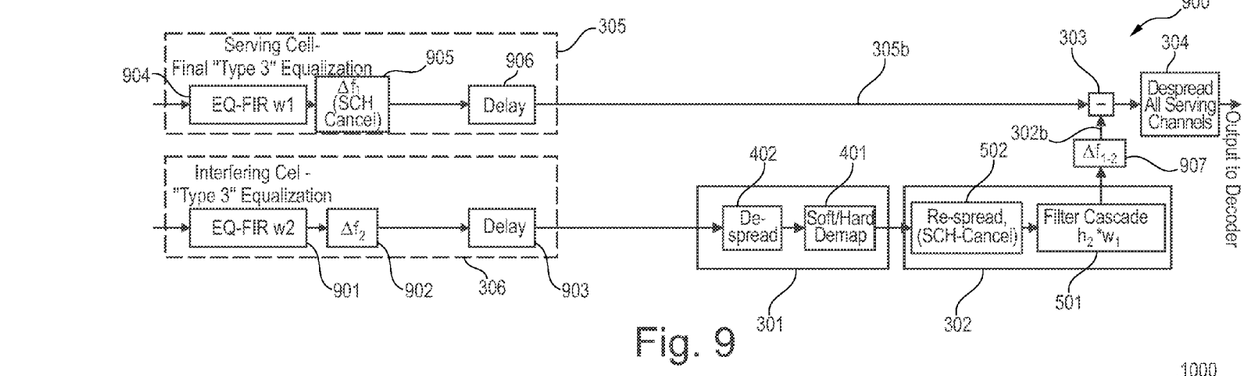
FIG. 9 is a block diagram illustrating an exemplary implementation of a radio receiver apparatus in accordance with FIG. 3.

FIG. 9 illustrates a radio receiver apparatus 900. Radio receiver apparatus 900 may be a more detailed exemplary implementation of radio receiver apparatus 300 of FIG. 3. The interfering cell signal processing structure 306 may comprise an equalizer 901. The equalizer 901 may be a linear equalizer. The equalizer 901 may be a FIR (Finite Impulse Response) filter operating with equalizer coefficients $w_2$. The equalizer 901 may be a so-called type 3 equalizer.

The interfering cell signal processing structure 306 may further comprise a frequency correction stage 902 and a delay unit 903. The delay unit 903 may be implemented by a buffer from which data may be read at an appropriate timings.

The serving cell signal processing structure 305 may likewise comprise an equalizer 904, a frequency correction stage 905, and a delay unit 906. The equalizer 904 may be a linear equalizer. The equalizer 904 may be a FIR (Finite Impulse Response) filter operating with equalizer coefficients $w_1$. The equalizer 904 may does not need to be an interference-aware equalizer (because interference is removed later anyhow). That is, the equalizer 904 may be an interference-unaware so-called type 3 equalizer. The equalizer 901 may, e.g., be a so-called type 3i equalizer, which is an interference-aware equalizer. An interference-aware equalizer suppresses interference from neighboring cells (i.e. here e.g. from the serving cell) by its stochastic and spectral characteristics with a linear filter of filter coefficients $w_2$. The delay unit 906 may be implemented by a buffer from which data may be read at appropriate timing(s).

The interfering cell detector 301 may comprise the interfering cell despreader 402 and the interfering cell demodulator 401. The interfering cell demodulator 401 may be a soft or hard demapper. Byway of example, QPSK, 16QAM, and 64QAM symbols may be demodulated. A soft demapper may approximate the MAP (maximum a posteriori) criterion with, e.g., a piecewise linear approximation. The interfering cell synthesizer 302 may comprise the interfering cell re-spreader 502 and the filter 501. The filter 501 may be implemented by a filter cascade $h_2*w_1$. The filter cascade $h_2*w_1$ represents the path from the interfering cell (channel coefficients $h_2$) to the serving cell equalizer branch (equalizer coefficients $w_1$).

The output of the filter 501 may be subjected to a frequency correction in a frequency correction stage 907 to provide the synthesized interfering cell signal 302b. As already described, the serving cell interference removing unit 303 removes the synthesized interfering cell signal 302b from the serving cell signal 305b, e.g. by subtraction. The output of the serving cell interference removing unit 303 may be despread, demodulated and, e.g., channel decoded as described before in serving cell detector 304.

Thus, linear interference suppression as performed by an interference-aware equalizer, e.g. a type 3i equalizer, in an initial step is combined with non-linear interference cancellation by interference removal, e.g., subtraction of a re-synthesized interference signal in a next step. To that end, symbols of the interfering cell are detected, the estimated transmitted interfering cell signal is re-synthesized and removed prior to demodulation and decoding of the serving cell signal.

Figure 10:
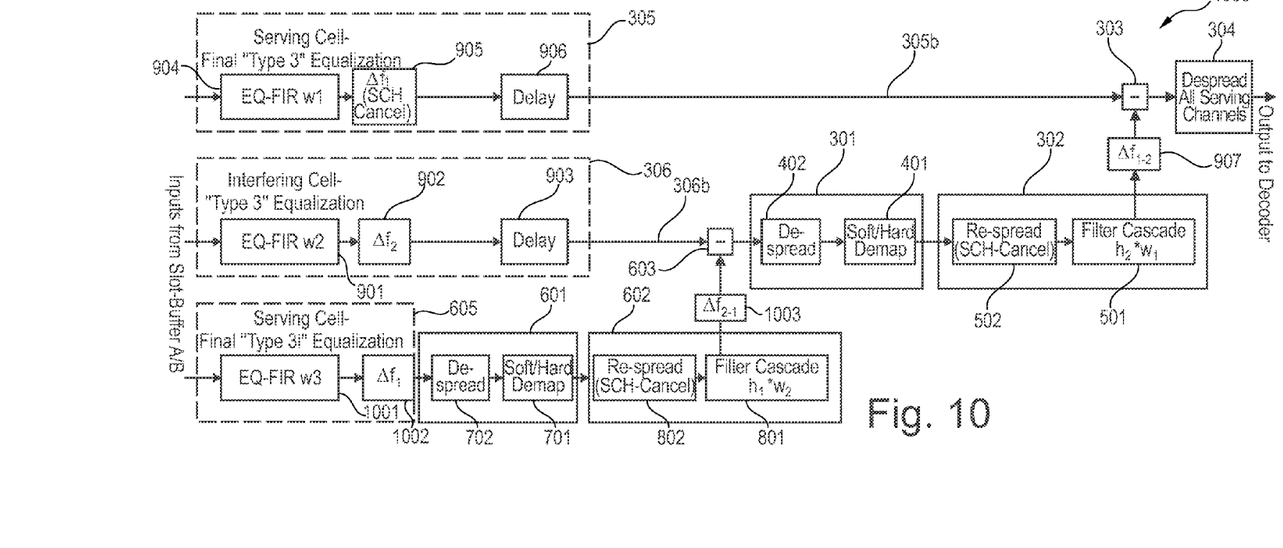
FIG. 10 is a block diagram illustrating an exemplary implementation of a radio receiver apparatus in accordance with FIG. 6.

On the other hand, the serving cell signal may represent the main interference which limits the detection of the interfering cell signal. Thus, as already described in conjunction with FIG. 6, a similar approach as described above for removing interference from the serving cell signal 305b may be used to remove interference from the interfering cell signal 306b supplied to the interfering cell detector 301. FIG. 10 illustrates an exemplary radio receiver apparatus 1000 using this approach. Radio receiver apparatus 1000 may e.g. be a more detailed implementation of radio receiver apparatus 600 illustrated in FIG. 6.

Radio receiver apparatus 1000 may comprise the radio receiver apparatus 900 supplemented by a branch to remove interference from the interfering cell signal 306b provided by the interfering cell signal processing structure 306. More specifically, the radio receiver apparatus 1000 may further comprise the second serving cell signal processing structure 605, the serving cell detector 601, the serving cell synthesizer 602 and the interfering cell interference removing unit 603 as already explained in conjunction with FIG. 6. The second serving cell signal processing structure 605 may comprise an linear equalizer operating with equalizer coefficients $w_3$. The linear equalizer 1001 may be an interference-aware equalizer, e.g. a type 3i equalizer.

The equalized serving cell signal may be passed to a frequency correction stage 1002. The serving cell detector 601 may comprise a serving cell despreader 702 and a serving cell demodulator 701 as described before (FIG. 7). The serving cell synthesizer 602 may comprise a serving cell re-spreader 803 and a filter 801 as described before (FIG. 8). The filter 801 may be a filter cascade $h_1*w_2$ representing the path from the serving cell (estimated channel coefficients $h_1$) to the interfering cell equalizer branch (equalizer coefficients $w_2$). The output of the filter 801 may be frequency-corrected by a frequency correction stage 1003 providing for a frequency correction which may be inverse to the frequency correction of frequency correction stage 907.

The radio receiver apparatus 1000 may operate as follows: First, the serving cell may be equalized with the linear equalizer 1001. The equalizer coefficients $w_3$ are matched to the serving cell and may be configured to suppress the interfering cell signal. The output of the linear equalizer 1001 is detected by serving cell detector 601 and the (CDMA) serving cell signal transmitted by the base station defining the service cell is re-synthesized by serving cell synthesizer 602.

The re-synthesized signal is then removed, e.g. canceled or subtracted (by the interfering cell interference removing unit 603) from the interfering cell signal equalized with the linear equalizer 901. The linear equalizer 901 uses equalizer coefficients $w_2$ matched to the interfering cell output signal.

The signal generated by the interfering cell interference removing unit 603 is then fed into another instance of the interference cancellation branch 601, 602, namely to interference cancellation branch 301, 302. The interference cancellation branch 301, 302 is configured to detect and re-synthesize the CDMA signal of the interfering cell as described before.

The signal provided by the interference cancellation branch 301, 302 is finally removed, e.g. canceled or subtracted from the output of the linear equalizer 904 (by the serving cell interference removing unit 303). The linear equalizer 904 operates with equalizer coefficients $w_1$ matched to the serving cell. All equalizers 901, 904 and 1001 may be MMSE (minimum mean square error) equalizers.

The timing of the serving cell signal 305b prior to interference removal may be adjusted by delay unit 906 so that processing delays are compensated and signals are combined according to their air interface timing. Thus, the delay unit 903, 906 and the frequency correction units 1003, 907 provide for a time and frequency alignment between the interference cancellation branch 601, 602 and the interfering cell signal processing structure 306 and for a time alignment between the interference cancellation branch 301, 302 and the serving cell signal processing structure 305, respectively. More generally, delay units 903 and 906 serve for compensation of processing delays in processing paths that feed in cancellation signal.

It is to be noted that the interference cancellation branches 301, 302 and 601, 602 may be implemented by separate hardware or by the same hardware using different input parameters (spreading codes, modulation schemes, filter coefficients) in, e.g., a time multiplexed operation.

Figure 11:
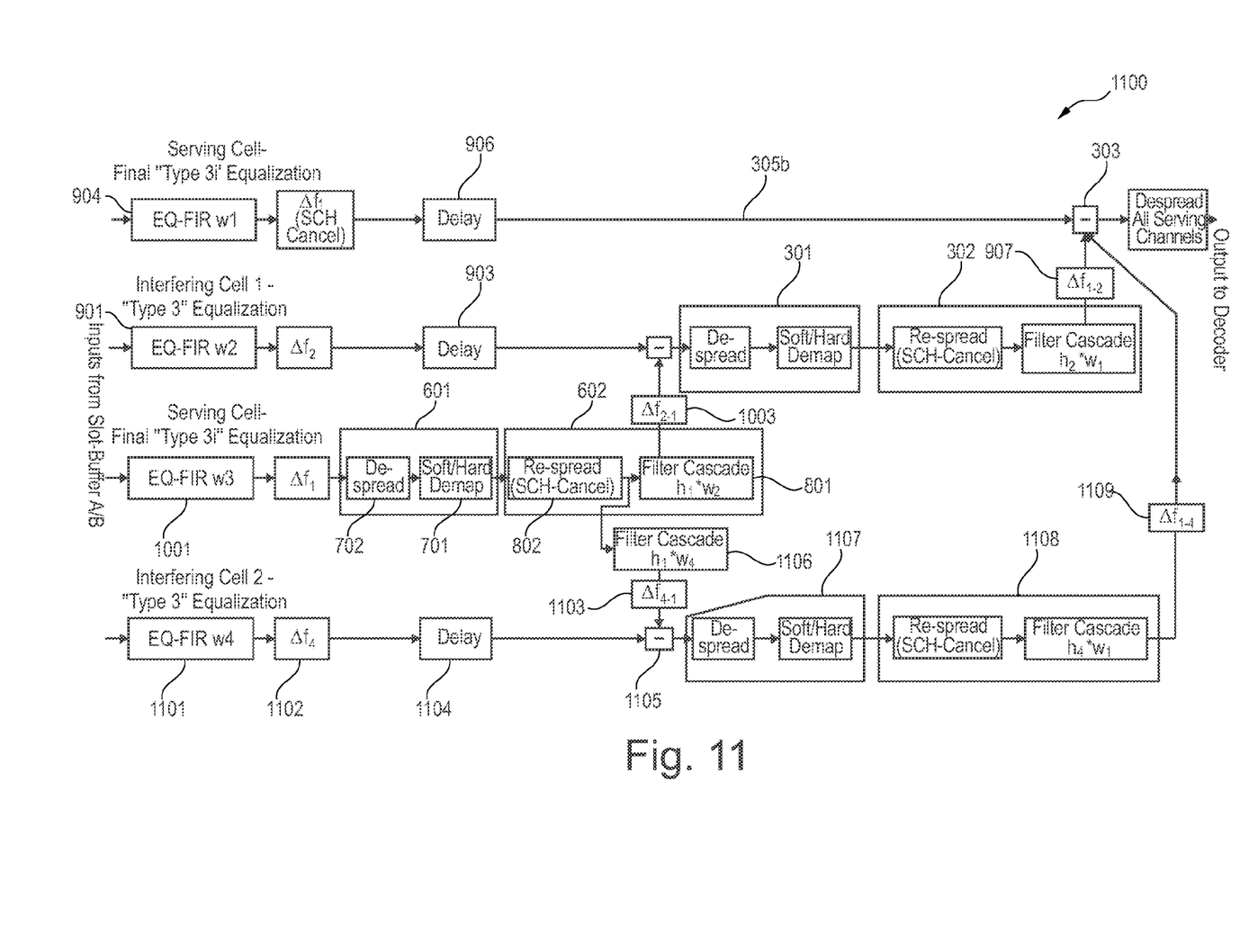
FIG. 11 is a block diagram illustrating an exemplary implementation of a radio receiver apparatus having two interfering cell interference removing units in accordance with the disclosure.

FIG. 11 illustrates an exemplary radio receiver apparatus 1100. The radio receiver apparatus 1100 is configured to cancel interference from two interfering cells. The radio receiver apparatus 1100 may comprise, e.g., all the elements of the radio receiver 1000 (FIG. 10). It may further comprise a second linear interfering cell equalizer 1101, a frequency correction stage 1102, a delay unit 1104, a frequency correction stage 1103, an interfering cell interference removing unit 1105, a second interfering cell detector 1107, a second interfering cell synthesizer 1108, and a frequency correction stage 1109. The equalizer 1101 uses equalizer coefficients $w_4$ matched to the second interfering cell. Appropriate frequency and timing correction is performed by the frequency correction stage 1102 and the delay unit 1104, respectively. A filter 1106 may be represented by a filter cascade using estimated channel coefficients $h_1$ and equalizer coefficients $w_4$. The input signal of the filter 1106 may be provided by the output of the re-spreader 802. The filter 1106 represents the path from the serving cell (estimated channel coefficients $h_1$) to the second interfering cell equalizer branch (equalizer coefficients $w_4$).

The filtered signal output by the filter 1106 is removed, e.g., subtracted from the signal provided by the second interfering cell equalizer 1101 in order to remove interference caused by the serving cell from this signal. In other words, interference removal from the equalized signal of the second interfering cell may be performed the same way as interference removal from the equalized signal of the first interfering cell. Briefly, the output of the second interfering cell interference removing unit 1105 is detected by the second interfering cell detector 1107 and re-synthesized by the second interfering cell synthesizer 1108. After time and frequency alignment provided by the delay unit 1104 and the (inverse) frequency correction stages 1103 and 1109, the re-synthesized second interfering cell signal may be removed from the serving cell signal 305b in addition to the re-synthesized signal of the first interfering cell in serving cell interference removing unit 303.

It is to be noted that the interference cancellation branches 301, 302 and 601, 602 and 1107, 1108 may be implemented by triplicated hardware, duplicate hardware or by one hardware path operated at appropriate parameters in a time multiplexed fashion.

Figure 12:
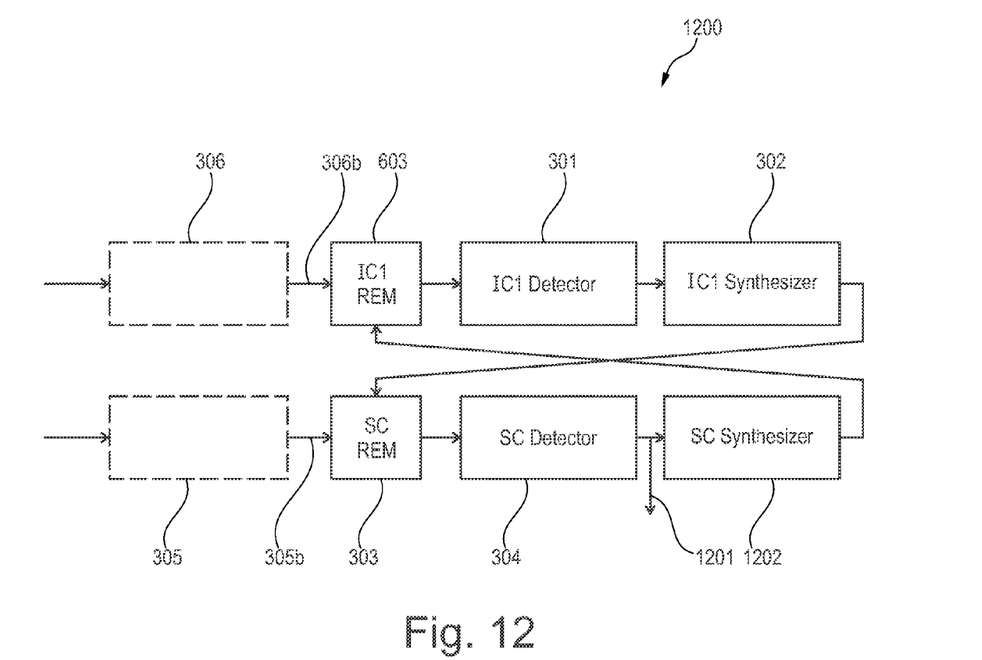
FIG. 12 is a block diagram illustrating an exemplary implementation of a radio receiver apparatus for cross interference cancellation in accordance with the disclosure.

FIG. 12 illustrates an exemplary radio receiver apparatus 1200. The radio receiver apparatus 1200 uses a cross-interference cancellation method for generating a serving cell detector output signal 1201.

More specifically, the radio receiver apparatus 1200 may comprise the serving cell signal processing structure 305, the serving cell interference removing unit 303, the serving cell detector 304 (which is similar to serving cell detector 601), a serving cell synthesizer 1202 (which is similar to serving cell synthesizer 602), the interfering cell signal processing structure 306, the interfering cell interference removing unit 603, the interfering cell detector 301, and the interfering cell synthesizer 302. Reference is made to the description of these elements in order to avoid reiteration.

An output of the interfering cell synthesizer 302 may be coupled to an input of the serving cell interference removing unit 303 to remove interference from the serving cell signal 305b provided by the serving cell signal processing structure 305. Further, an output of the serving cell synthesizer 1202 may be coupled to an input of the interfering cell interference removing unit 603 to remove interference caused by the serving cell from the interfering cell signal 306b provided by the interfering cell signal processing structure 306.

In the serving cell processing branch 305, 303, 304, and 1202 of the radio receiver apparatus 1200, interference caused by the interfering cell is removed from the serving cell signal 305b prior to demodulation in the serving cell detector 304. In the interfering cell processing branch 306, 603, 301, and 302, interference caused by the serving cell is removed from the interfering cell signal 306b prior to demodulation in the interfering cell detector 301.

Modes of operation of the radio receiver apparatus 1200 of FIG. 12 may be as follows (reference numerals of units which may be used for operation are added in brackets):

A) Single Interference Removal

A first version of an interfering cell signal is detected (301), synthesized (302) and removed (303) from the serving cell signal 305b. The serving cell signal 305b is delayed until the detection (301) and re-synthesis (302) of the interfering cell signal is done so that the signal removal, e.g. signal subtraction, in serving cell interference removing unit 303 is performed on synchronized signals.

B) Cross Cancellation with One Full Iteration

A first version of the serving cell input signal 305b is detected (304) and re-synthesized (1202). The serving cell interference removing unit (303) is by-passed at this stage of processing (or, equivalently a correction signal of value 0 is subtracted). Interference cancellation (603) is based on the output of the serving cell synthesizer 1202. The interfering cell signal 306b is delayed until the re-synthesized signal from serving cell synthesizer 1202 is available and synchronized for interference cancellation (603), e.g. subtraction. The interference-canceled (603) signal is detected (301), re-synthesized (302) and removed from the serving cell signal 305b. To that end, the serving cell signal 305b may be retrieved a second time from the serving cell signal processing structure 305 so that it is synchronized to the synthesized (302) interference correction signal. The output of the serving cell interference removing unit 303 is detected (304). The output 1201 of the serving cell detector 304 may correspond to output 601b (FIG. 7) if the serving cell detector 304 outputs demodulated soft or hard serving cell symbols, or may correspond to output 601b' (FIG. 7) if the serving cell detector 304 further comprises a serving cell channel decoder 703. Analogously, the serving cell synthesizer 1202 may correspond to serving cell synthesizer 602 (FIG. 8), which may either comprise a serving cell channel encoder 803 for receiving signal 601b' or which is without serving cell channel encoder 803 for receiving input signal 601b.

C) Cross-Cancellation with Multiple Half or Full Iterations

As an extension to the above, multiple half or full iterations may be performed. A half iteration corresponds to one interference removal process either performed by serving cell interference removal unit 303 or by interfering cell interference removal unit 603. A full iteration corresponds to a cross-interference cancellation operation which comprises one interference removal operation performed by interfering cell interference removal unit 603 and one operation performed by serving cell interference removal unit 303 as described in B). It is to be noted that appropriate time alignment, i.e. signal delay and/or multiple delayed signal retrieval of serving cell signal 305b and interfering cell signal 306b is used for time alignment of serving cell signal processing and interfering cell signal processing during iterative operation.

Optionally, in case of multiple iterations the interference suppression in the linear interference-aware equalizers 904 (equalizer coefficients $w_1$) and 901 (equalizer coefficients $w_2$) may be adapted to the remaining interference level in the corresponding signal processing branch to better match with the corresponding signals after cancellation of interference. By way of example, the interference-aware contributions in the equalizer coefficients $w_1$, $w_2$ of the linear interference-aware equalizers 904, 901, respectively, may be weighted by a weight which varies with the number of iterations. The higher the number of iterations, the smaller may become the weight. Using this approach, signal versions of the serving cell signal 305b and/or of the interfering cell signal 306b may vary from iteration to iteration.

Further optional modifications are possible. By way of example, a cancellation of completely a-priori known channels such as, e.g., the CPICH (Common Plilot CHannel) or the SCH (Synchronization CHannel) may be performed without demodulating these channels. This will be explained further below by way of example. Further, partly known channels such as, e.g., HS-SCCH (High Speed Shared Controlled CHannel) and HS-PDSCH (High Speed Physical Downlink Shared CHhannel), for which only the position of allocated codes is known on the serving cell, may be decoded by a channel decoder and decoded bits may be used for re-synthesis of serving cell signals used for interference cancellation of the interfering cell signal 306b. This approach will also be explained by way of example further below.

Figure 13:
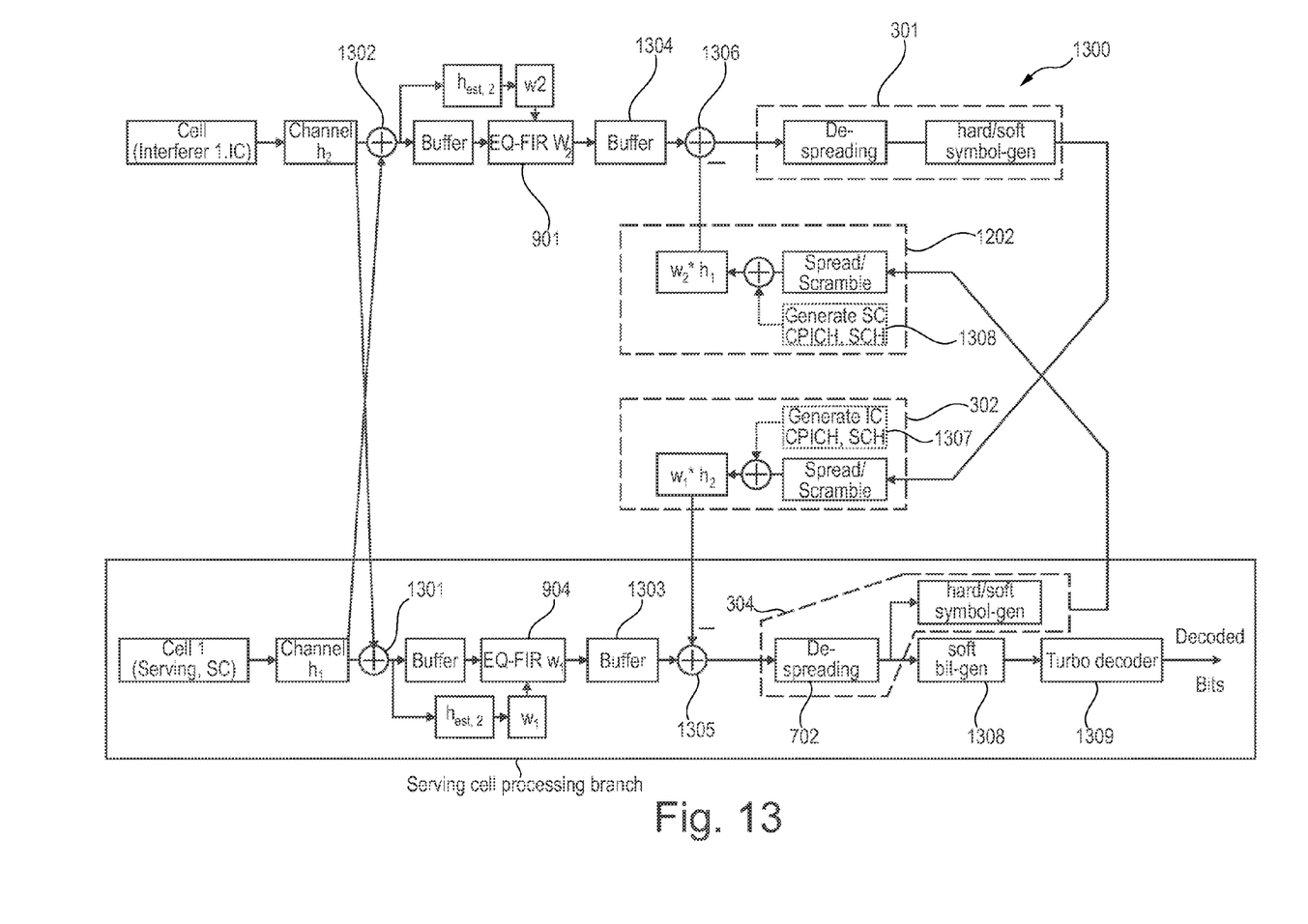
FIG. 13 is a block diagram illustrating an exemplary implementation of a radio receiver apparatus in accordance with FIG. 12.

FIG. 13 illustrates an exemplary radio receiver apparatus 1300. The radio receiver apparatus 1300 may correspond to radio receiver apparatus 1200, and reference is made to the above description in order to avoid reiteration.

By way of example, both the serving cell (Cell 1) and the interfering cell (Cell 2) may transmit WCDMA/HSPA+ signals. The signals are propagated through wireless propagation fading channels $h_1$ and $h_2$, respectively. The adders 1301, 1302 may represent, in an equivalent circuit diagram, the cross-interference caused by the two channels.

The channels $h_1$ and $h_2$ are estimated and the channel estimates $h_{est,1}$ and $h_{est,2}$ may be used to compute the equalizer coefficients $w_1$ and $w_2$, respectively. The equalizer coefficients $w_1$ are matched to the serving cell and suppress the interfering cell by, e.g., an interference-aware MMSE type 3i receiver structure. Likewise, the equalizer coefficients $w_2$ are matched to the interfering cell and suppress the serving cell by, e.g., an interference-aware MMSE type 3i receiver structure. Equalization may be performed by equalizers 904 and 901, respectively, as described before.

An output of equalizer 904 is coupled to a buffer 1303. The buffer 1303 may represent the delay unit 906 in FIG. 9. An output of the equalizer 901 is coupled to a buffer 1304. The buffer 1304 may represent the delay unit 903 in FIG. 9. E.g., subtractors 1305 and 1306 correspond to serving cell interference removal unit 303 and interfering cell interference removal unit 603, respectively.

As illustrated in FIG. 13, the known channels CPICH, SCH of the serving cell and of the interfering cell may be generated in generators 1308 and 1307, respectively. Further, FIG. 13 illustrates a soft bit generation in soft bit generation unit 1308 based on the output of the despreader (corresponding to serving cell despreader 702) in the serving cell detection branch. The soft bits generated in the soft bit generation unit 1308 are soft bits of the modulation scheme constellation points. A channel decoder, e.g. a turbo-decoder 1309, may receive the soft bits and generates the decoded bits.

It is to be noted that in all embodiments described herein interference removal may, e.g., be performed before despreading, i.e. on chip-level. Performing interference removal on chip-level avoids intercode and multi-path effects which could be hard to compensate after despreading. However, interference removal may also be done after despreading, e.g. on symbol level.

Figure 14:
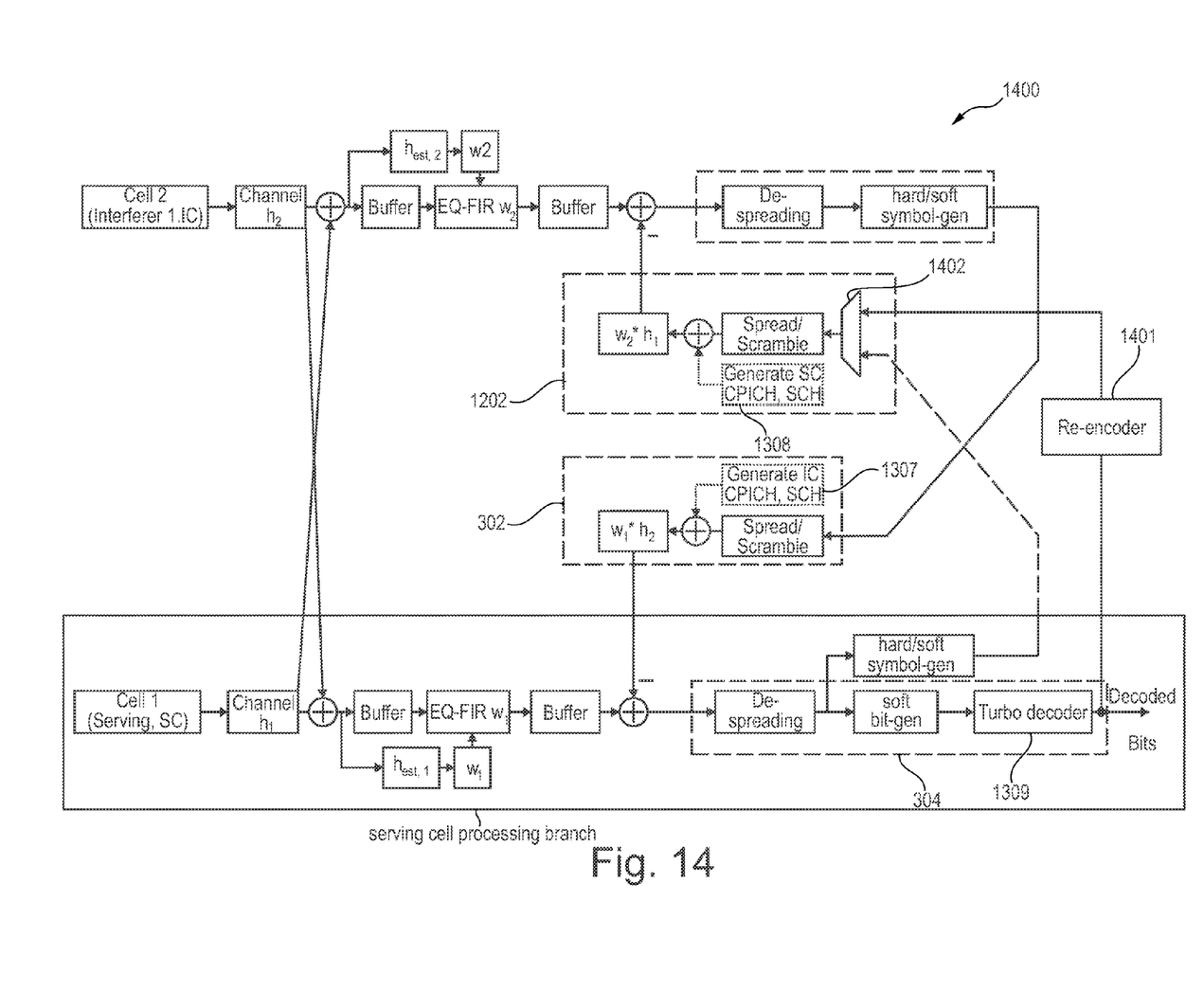
FIG. 14 is a block diagram illustrating an exemplary implementation of a radio receiver apparatus in accordance with FIG. 12.

FIG. 14 illustrates an exemplary radio receiver apparatus 1400. Radio receiver apparatus 1400 may be identical to radio receiver apparatus 1300 except that the serving cell detector 304 may comprise the turbo-decoder 1309 and thus corresponds to the serving cell detector 601 of FIG. 7. The decoded bits provided by the turbo-decoder 1309 are re-encoded in channel encoder 1401 (corresponding to serving cell channel encoder 803 of FIG. 8) by using the transport block format known to the UE under consideration. The re-encoded bits are then passed to the serving cell synthesizer 1202.

Optionally, the serving cell synthesizer 1202 may be equipped with a selector switch 1402. The selector switch 1402 may be operated to either provide re-coded bits or demodulated symbols for further processing. Based on the selector switch setting, power consumption and/or interference cancellation performance may be effected.

Figure 15:
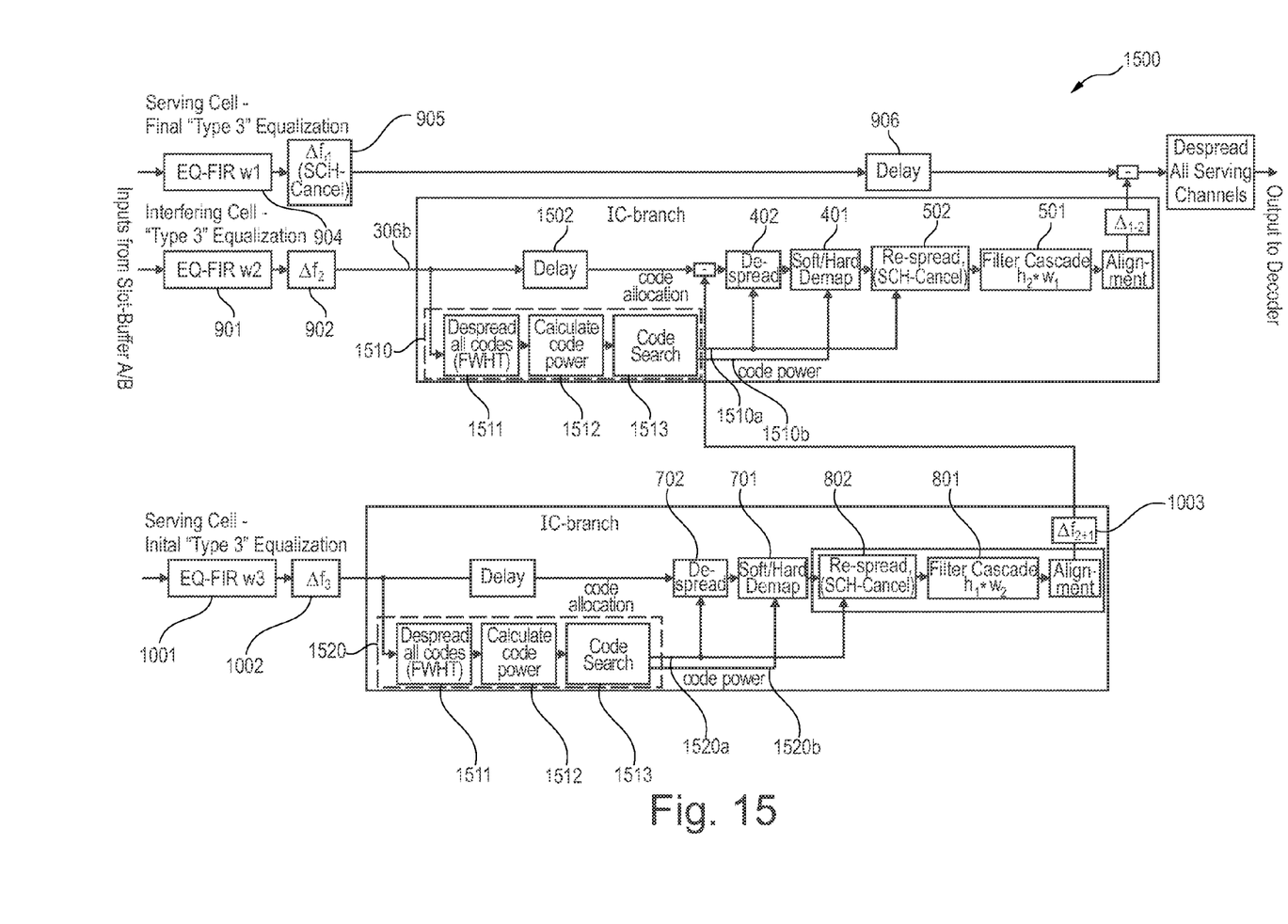
FIG. 15 is a block diagram illustrating an exemplary implementation of an interference cancellation branch of a serving cell and an exemplary implementation of an interference cancellation branch of an interfering cell in a radio receiver apparatus in accordance with the disclosure.

FIG. 15 illustrates an exemplary radio receiver apparatus 1500. Radio receiver apparatus 1500 may correspond to one or more of the radio receiver apparatus described before, and reference is made to the description above to avoid reiteration. In particular, radio receiver apparatus 1500 may be a more detailed illustration of the radio receiver apparatus 1000 of FIG. 10.

Generally, the channelization (e.g. the spreading codes) used in the interfering cell are unknown for the UE under consideration. Further, also the channelization (e.g. spreading codes) allocated to other users of the serving cell are unknown. Therefore, in order to synthesize the interfering cell signal and/or the serving cell signal, information about the channelization (e.g. spreading codes) used in the interfering cell and/or information about the channelization for other users (e.g. spreading codes allocated to other users) must be provided for interfering cell interference removal and serving cell interference removal, respectively. In particular, knowledge about e.g. all used spreading codes of the serving cell and/or the interfering cell may be needed.

Basically, this information may be obtained by signaling from the respective base stations and/or by estimating this information. Estimating may comprise a code search of spreading codes and, in particular, all spreading codes used in the corresponding cell (interfering cell and/or serving cell). Without loss of generality, in the following it is assumed that OVSF (orthogonal variable spreading factor) codes are used for channelization in the interfering cell and in the serving cell.

According to FIG. 15, the radio receiver apparatus 1500 may comprise an interfering cell code search unit 1510. The interfering cell code search unit 1510 may have an input coupled to an output of the interfering cell equalizer 901. The interfering cell code search unit 1510 may perform a code search over all OVSF codes, i.e. over the complete WCDMA OVSF code tree. The interfering cell code search unit 1510 may have a first output 1510a indicating the allocated spreading codes and a second output 1510b indicating the code power of the allocated spreading code. The first output 1510a may be provided to the despreader 402 and the re-spreader 502 to enable the despreader 402 and re-spreader 502 to despread and re-spread all used spreading code signals. The second output 1510a may e.g. be provided to the demodulator (e.g. soft/hard demapper) 401 for demodulation, if needed. An internal delay unit 1502 may be used to compensate for the measurement delay of the interfering cell code search unit 1510.

The interfering cell code search unit 1510 may e.g. comprise a despreader for e.g. all codes 1511, an evaluation unit 1512 and a code identification unit 1513.

The despreader 1511 may be a fast walsh-hadamard transformation (FWHT) despreader. The FWHT despreader may despread the complete WCDMA OVSF code tree comprising a fixed number of spreading codes. The evaluation unit 1512 may comprise a calculation stage to calculate the code power of each code and, e.g., a metric based on the per-code power measurement. The code powers and/or the corresponding metric values may be passed to the code identification unit 1513, which decides whether a scanned spreading code is used and, if it is used. The re-spreader 502 may be an inverse fast walsh-hadamard transformation (iFWHT) re-spreader which synthesizes the signal transmitted by the interfering cell base station.

The serving cell processing branch may comprise a serving cell code search unit 1520. The serving cell code search unit 1520 may be similar to the interfering cell code search unit 1510. However, at least the spreading code(s) used by the UE under consideration are known, and thus, it may be possible that not all of the spreading codes of the OVSF tree are despreaded for code search. Similar to interfering cell code search unit 1510, the serving cell code search unit 1520 may generate a first output 1520a indicating the code allocation and a second output 1520b indicating the code power of used spreading codes. Similar to re-spreader 502, the re-spreader 802 may be an iFWHT re-spreader. The re-spreader 802 may synthesize the spreaded (in general, channelized) signal transmitted by the base station of the serving cell.

EXAMPLES

The following examples pertain to further embodiments.

Example 1 is a radio receiver apparatus comprising a serving cell detector configured to generate a detected serving cell signal based on a serving cell detector input signal; a first interfering cell detector configured to generate a detected first interfering cell signal based on a first interfering cell detector input signal; a first interfering cell synthesizer configured to generate a synthesized first interfering cell signal based on the detected first interfering cell signal; and a serving cell interference removing unit configured to remove the synthesized first interfering cell signal from a serving cell signal to generate the serving cell detector input signal.

In Example 2, subject matter of Example 1 can optionally include wherein the first interfering cell detector comprises a first interfering cell demodulator configured to generate demodulated first interfering cell symbols.

In Example 3, the subject matter of any of Examples 1-2 can optionally include wherein the first interfering cell detector further comprises a first interfering cell despreader.

In Example 4, the subject matter of any of Examples 1-3 can optionally include wherein the first interfering cell synthesizer comprises a filter configured to provide the synthesized first interfering cell signal with an interfering cell channel distortion.

In Example 5, the subject matter of any of Examples 1-4 can optionally include wherein the first interfering cell synthesizer comprises a re-spreader configured to re-spread the detected first interfering cell signal by a spreading code used in the interfering cell.

In Example 6, the subject matter of any of Examples 1-5 can optionally include a serving cell equalizer configured to generating the serving cell signal.

In Example 7, the subject matter of any of Examples 1-6 can optionally include a serving cell synthesizer configured to generate a synthesized serving cell signal based on the detected serving cell signal; and a first interfering cell interference removing unit configured to remove the synthesized serving cell signal from a first interfering cell signal to generate the first interfering cell detector input signal.

In Example 8, the subject matter of any of Examples 1-7 can optionally include a serving cell channel decoder configured to generate a channel decoded serving cell signal; a serving cell synthesizer configured to generate a synthesized serving cell signal based on the channel decoded serving cell signal; and a first interfering cell interference removing unit configured to remove the synthesized serving cell signal from a first interfering cell signal to generate the first interfering cell detector input signal.

In Example 9, the subject matter of any of Examples 1-8 can optionally include a second interfering cell detector configured to generate a detected second interfering cell signal based on a second interfering cell detector input signal; a second interfering cell synthesizer configured to generate a synthesized second interfering cell signal based on the detected second interfering cell signal; and wherein the serving cell interference removing unit is further configured to remove the synthesized second interfering cell signal from the serving cell signal to generate the serving cell detector input signal.

In Example 10, the subject matter of any of Examples 1-9 can optionally include wherein the first interfering cell detector further comprises a code search unit configured to identify at least one spreading code used in the first interfering cell detector input signal.

In Example 11, the subject matter of any of Examples 1-10 can optionally include wherein the first interfering cell despreader is configured to despread the first interfering cell detector input signal by the at least one identified spreading code.

In Example 12, the subject matter of any of Examples 1-11 can optionally include wherein the code search unit comprises a code search despreader which is configured to perform a fast walsh-hadamard-transformation.

In Example 13, the subject matter of any of Examples 1-12 can optionally include wherein the first interfering cell synthesizer comprises a re-spreader configured to re-spread the detected first interfering cell signal by the at least one identified spreading code.

In Example 14, the subject matter of any of Examples 1-13 can optionally include wherein the re-spreader is configured to perform an inverse fast walsh-hadamard-transformation.

In Example 15, a method of canceling interference in radio systems comprises generating a detected first interfering cell signal based on a first interfering cell detector input signal; generating a synthesized first interfering cell signal based on the detected first interfering cell signal; removing the synthesized first interfering cell signal from a serving cell signal to generate a serving cell detector input signal; and detecting the serving cell detector input signal to generate a detected serving cell signal.

In Example 16, the subject matter of Example 15 can optionally include wherein generating the detected serving cell signal comprises demodulating the serving cell detector input signal.

In Example 17, the subject matter of any one of Examples 15-16 can optionally include wherein generating the detected first interfering cell signal further comprises despreading the first interfering cell detector input signal.

In Example 18, the subject matter of any one of Examples 15-17 can optionally include wherein generating the detected first interfering cell signal comprises demodulating the first interfering cell detector input signal.

In Example 19, the subject matter of any one of Examples 15-18 can optionally include wherein generating the detected first interfering cell signal comprises despreading the first interfering cell detector input signal.

In Example 20, the subject matter of any one of Examples 15-19 can optionally include before generating the detected first interfering cell signal, generating an initial version of the detected serving cell signal; generating a synthesized serving cell signal based on the detected initial version of the detected serving cell signal; and removing the synthesized serving cell signal from a first interfering cell signal to generate the first interfering cell detector input signal.

In Example 21, the subject matter of any one of Examples 15-20 can optionally include before generating the detected first interfering cell signal, generating an initial version of a channel decoded serving cell signal; generating a synthesized serving cell signal based on the initial version of the channel decoded serving cell signal; and removing the synthesized serving cell signal from a first interfering cell signal to generate the first interfering cell detector input signal.

In Example 22, the subject matter of any one of Examples 15-21 can optionally include equalizing a signal received from the serving cell to generate the serving cell signal.

In Example 23, the subject matter of any one of Examples 15-22 can optionally include generating a detected second interfering cell signal based on a second interfering cell detector input signal; generating a synthesized second interfering cell signal based on the detected second interfering cell signal; and removing the synthesized second interfering cell signal from the serving cell signal to generate the serving cell detector input signal.

Example 24 is a radio receiver apparatus comprising a code search unit configured to identify at least one spreading code used in a first cell signal; a despreader unit configured to despread the first cell signal by the at least one identified spreading code; a demodulator configured to demodulate the at least one despreaded first cell signal; and a synthesizing unit configured to generate a synthesized first cell signal based on the at least one demodulated first cell signal.

In Example 25, subject matter of Example 24 can optionally include an interference removing unit configured to remove the synthesized first cell signal from a second cell signal to generate a reduced interference second cell signal.

In Example 26, the subject matter of any one of Examples 24-25 can optionally include wherein the code search unit comprises a code search despreader which is configured to perform a fast walsh-hadamard-transformation.

In Example 27, the subject matter of any one of Examples 24-26 can optionally include wherein the synthesizer unit comprises a re-spreader configured to re-spread the at least one demodulated first cell signal by the at least one identified spreading code.

In Example 28, the subject matter of any one of Examples 24-27 can optionally include wherein the re-spreader is configured to perform an inverse fast walsh-hadamard-transformation.

In Example 29, the subject matter of any one of Examples 24-28 can optionally wherein the synthesizer unit comprises a filter stage configured to filter the re-spreaded signal by filter coefficients matched to a first cell channel distortion.

Although specific embodiments and examples have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments and examples described herein. Therefore, it is intended that this invention is limited only by the claims and the equivalents thereof.

What is claimed is:

1. A radio receiver apparatus, comprising:
   a serving cell detector configured to generate a detected serving cell signal based on a serving cell detector input signal;
   a first interfering cell detector configured to generate a detected first interfering cell signal based on a first interfering cell detector input signal;
   a first interfering cell synthesizer configured to generate a synthesized first interfering cell signal based on the detected first interfering cell signal, wherein the first interfering cell synthesizer comprises a filter configured to apply an interfering cell channel distortion based on estimated channel coefficients of the interfering cell to the synthesized first interfering cell signal and to match the synthesized first interfering cell signal to the serving cell signal based on equalizer coefficients of the serving cell; and a serving cell interference removing unit configured to remove the synthesized first interfering cell signal from a serving cell signal to generate the serving cell detector input signal.

2. The radio receiver apparatus of claim 1, wherein
the first interfering cell detector comprises a first interfering cell demodulator configured to generate demodulated first interfering cell symbols.

3. The radio receiver apparatus of claim 2, wherein
the first interfering cell detector further comprises a first interfering cell despreader.

4. The radio receiver apparatus of claim 1, wherein
the first interfering cell synthesizer comprises a filter configured to provide the synthesized first interfering cell signal with an interfering cell channel distortion.

5. The radio receiver apparatus of claim 1, wherein
the first interfering cell synthesizer comprises a re-spreader configured to re-spread the detected first interfering cell signal by a spreading code used in the interfering cell.

6. The radio receiver apparatus of claim 1, further comprising:
a serving cell equalizer configured to generating the serving cell signal.

7. The radio receiver apparatus of claim 1, further comprising:
a serving cell synthesizer configured to generate a synthesized serving cell signal based on the detected serving cell signal; and
a first interfering cell interference removing unit configured to remove the synthesized serving cell signal from a first interfering cell signal to generate the first interfering cell detector input signal.

8. The radio receiver apparatus of claim 1, further comprising:
a serving cell channel decoder configured to generate a channel decoded serving cell signal;
a serving cell synthesizer configured to generate a synthesized serving cell signal based on the channel decoded serving cell signal; and
a first interfering cell interference removing unit configured to remove the synthesized serving cell signal from a first interfering cell signal to generate the first interfering cell detector input signal.

9. The radio receiver apparatus of claim 1, further comprising:
a second interfering cell detector configured to generate a detected second interfering cell signal based on a second interfering cell detector input signal;
a second interfering cell synthesizer configured to generate a synthesized second interfering cell signal based on the detected second interfering cell signal; and
wherein the serving cell interference removing unit is further configured to remove the synthesized second interfering cell signal from the serving cell signal to generate the serving cell detector input signal.

10. A method of canceling interference in radio systems, comprising:
generating a detected first interfering cell signal based on a first interfering cell detector input signal;
generating a synthesized first interfering cell signal based on the detected first interfering cell signal, wherein generating the synthesized first interfering cell signal comprises
applying an interfering cell channel distortion based on estimated channel coefficients of the interfering cell to the synthesized first interfering cell signal, and
matching the synthesized first interfering cell signal to the serving cell signal based on equalizer coefficients of the serving cell;
removing the synthesized first interfering cell signal from a serving cell signal to generate a serving cell detector input signal; and
detecting the serving cell detector input signal to generate a detected serving cell signal.

11. The method of claim 10, wherein
generating the detected serving cell signal comprises demodulating the serving cell detector input signal.

12. The method of claim 10, wherein
generating the detected first interfering cell signal further comprises despreading the first interfering cell detector input signal.

13. The method of claim 10, wherein
generating the detected first interfering cell signal comprises demodulating the first interfering cell detector input signal.

14. The method of claim 10, wherein
generating the detected first interfering cell signal comprises despreading the first interfering cell detector input signal.

15. The method of claim 10, further comprising:
before generating the detected first interfering cell signal, generating an initial version of the detected serving cell signal;
generating a synthesized serving cell signal based on the detected initial version of the detected serving cell signal; and
removing the synthesized serving cell signal from a first interfering cell signal to generate the first interfering cell detector input signal.

16. The method of claim 10, further comprising:
before generating the detected first interfering cell signal, generating an initial version of a channel decoded serving cell signal;
generating a synthesized serving cell signal based on the initial version of the channel decoded serving cell signal; and
removing the synthesized serving cell signal from a first interfering cell signal to generate the first interfering cell detector input signal.

17. The method of claim 10, further comprising:
equalizing a signal received from the serving cell to generate the serving cell signal.

18. The method of claim 10, further comprising:
generating a detected second interfering cell signal based on a second interfering cell detector input signal;
generating a synthesized second interfering cell signal based on the detected second interfering cell signal; and
removing the synthesized second interfering cell signal from the serving cell signal to generate the serving cell detector input signal.

19. A radio receiver apparatus, comprising:
a code search unit configured to identify at least one spreading code used in a first cell signal;
a despreader unit configured to despread the first cell signal by the at least one identified spreading code;
a demodulator configured to demodulate the at least one despreaded first cell signal;
a synthesizing unit configured to generate a synthesized first cell signal based on the at least one demodulated first cell signal and a first cell channel distortion associated with filter coefficients of an interfering cell, the synthesizing unit being configured to apply the first cell channel distortion to the synthesized first cell signal; and an interference removing unit configured to remove the synthesized first cell signal from a second cell signal to generate a reduced interference second cell signal, wherein the code search unit is configured to provide the at least one identified spreading code to the despreader and to provide a code power of the at least one identified spreading code to the demodulator.

20. The radio receiver apparatus of claim 19, wherein the code search unit comprises a code search despreader which is configured to perform a fast walsh-hadamard-transformation.

21. The radio receiver apparatus of claim 19, wherein the synthesizer unit comprises a re-spreader configured to re-spread the at least one demodulated first cell signal by the at least one identified spreading code.

22. The radio receiver apparatus of claim 21, wherein the re-spreader is configured to perform an inverse fast walsh-hadamard-transformation.

23. The radio receiver apparatus of claim 21, wherein the synthesizer unit comprises a filter stage configured to filter the re-spreaded signal by the filter coefficients matched to the first cell channel distortion.

\* \* \* \* \*